Oct. 22, 1935.　　　W. B. FAGEOL　　　2,018,443
LOW BED DELIVERY TRUCK
Filed Aug. 28, 1929　　5 Sheets-Sheet 1
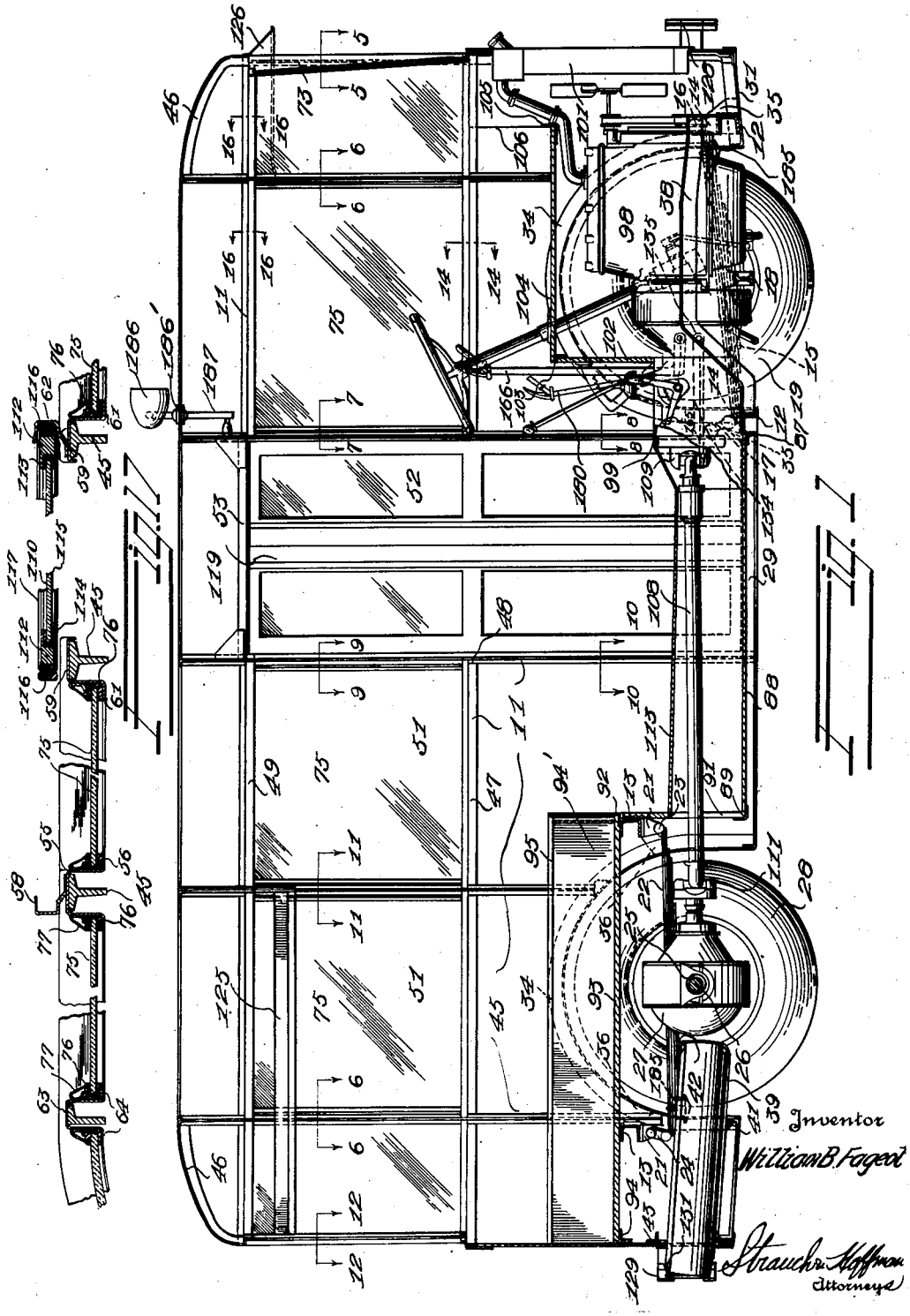

Oct. 22, 1935.   W. B. FAGEOL   2,018,443
LOW BED DELIVERY TRUCK
Filed Aug. 28, 1929   5 Sheets-Sheet 2
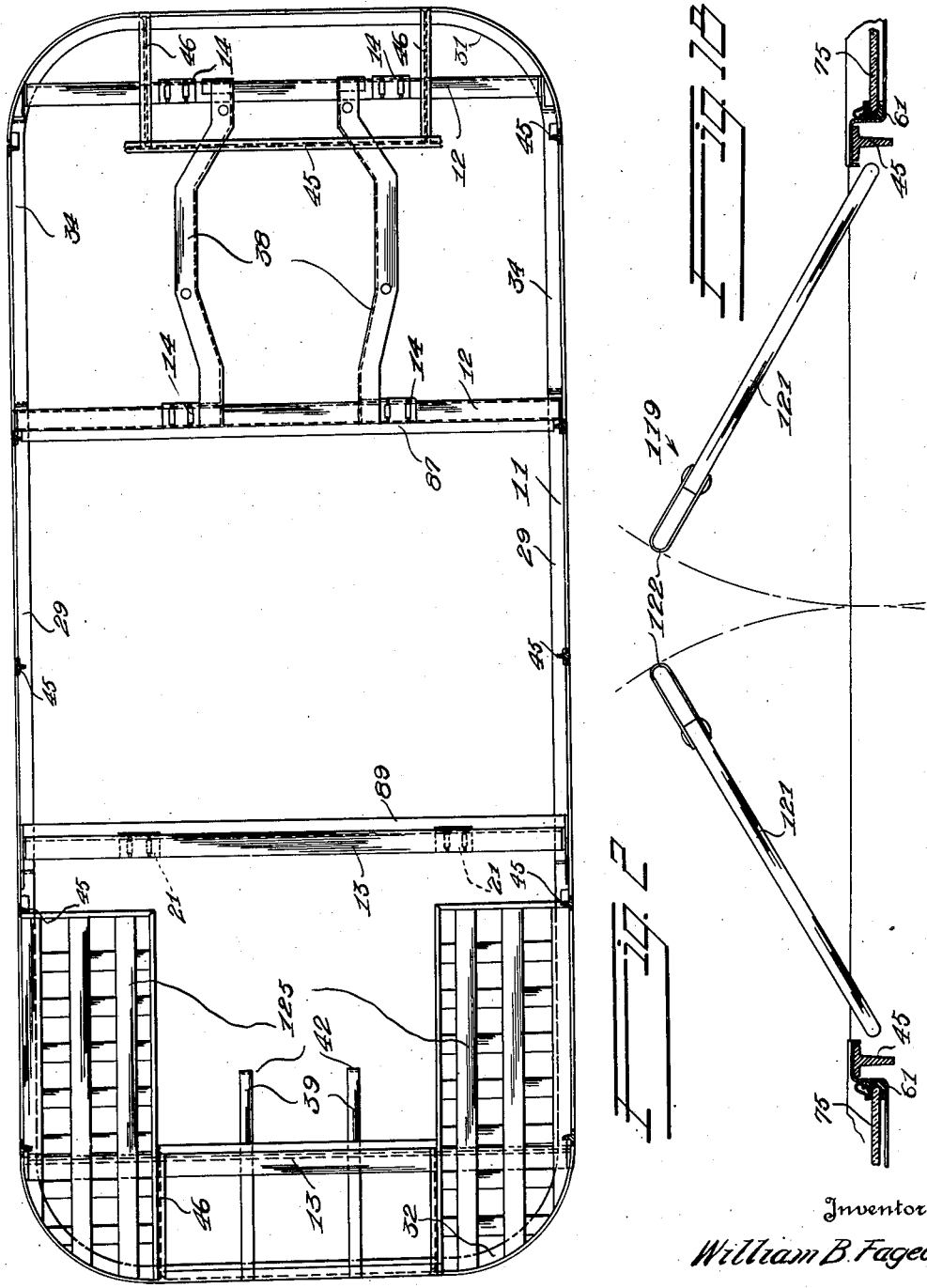
Inventor
William B. Fageol
By
Strauch & Hoffman
Attorneys

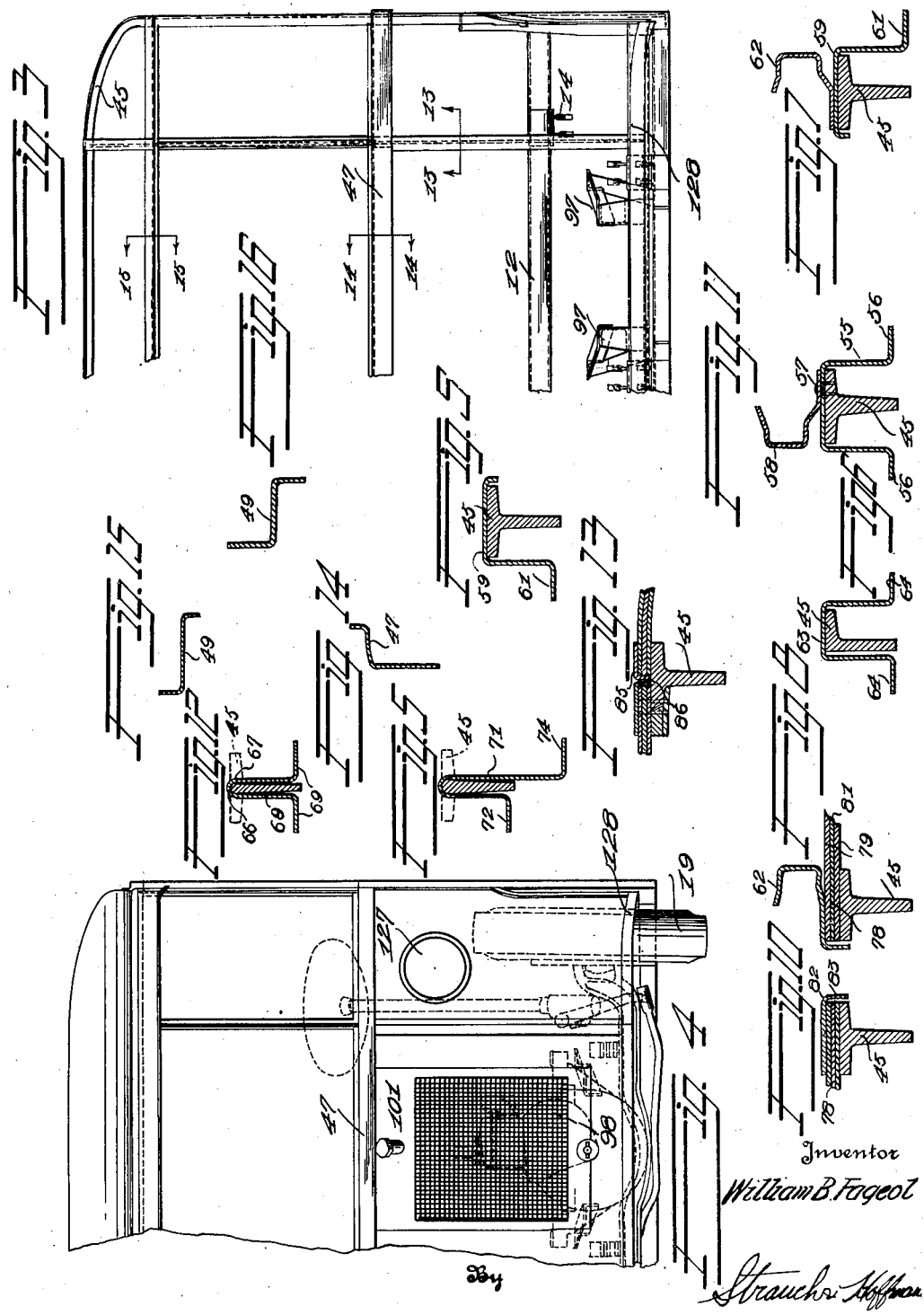

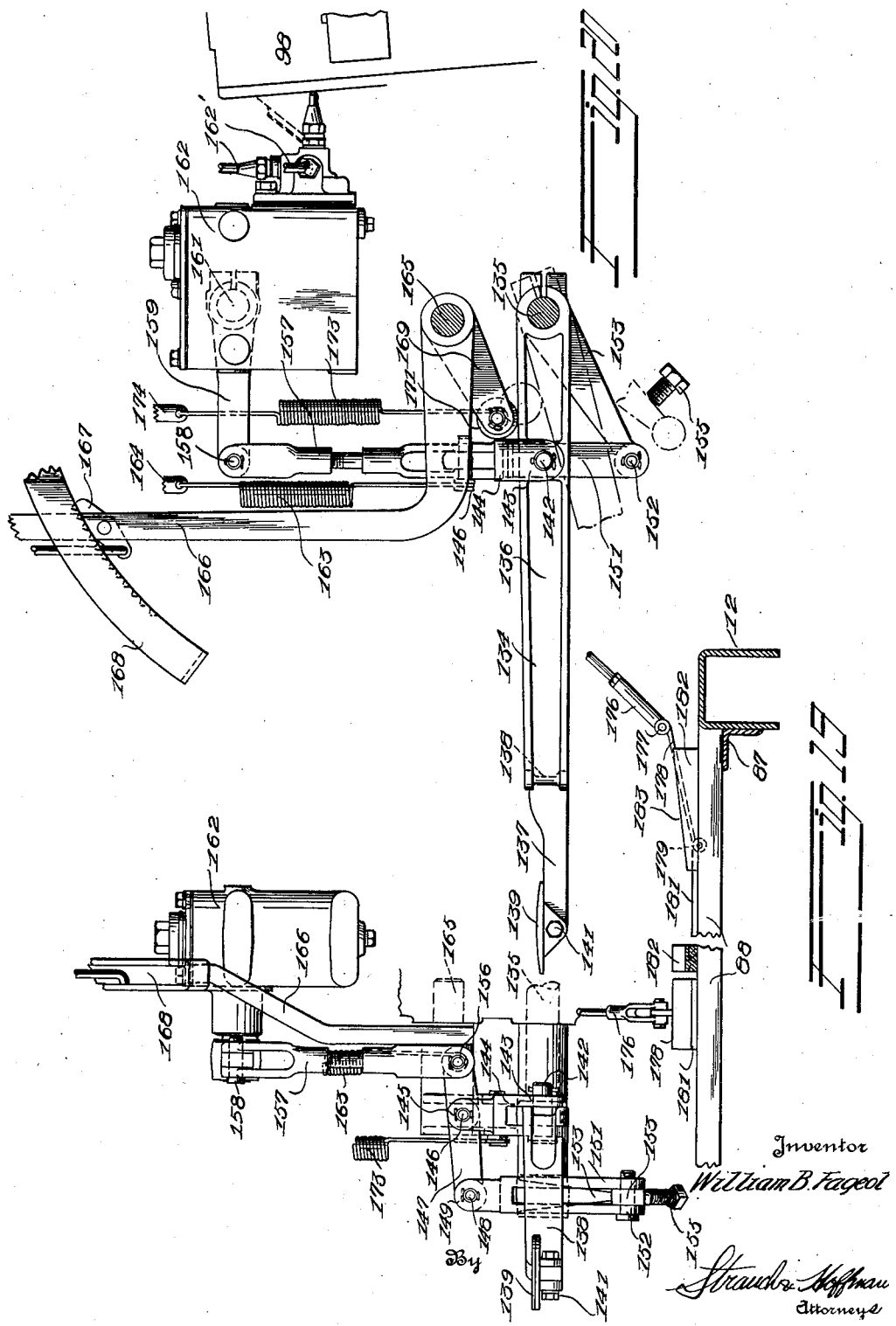

Oct. 22, 1935.  W. B. FAGEOL  2,018,443
LOW BED DELIVERY TRUCK
Filed Aug. 28, 1929  5 Sheets-Sheet 5
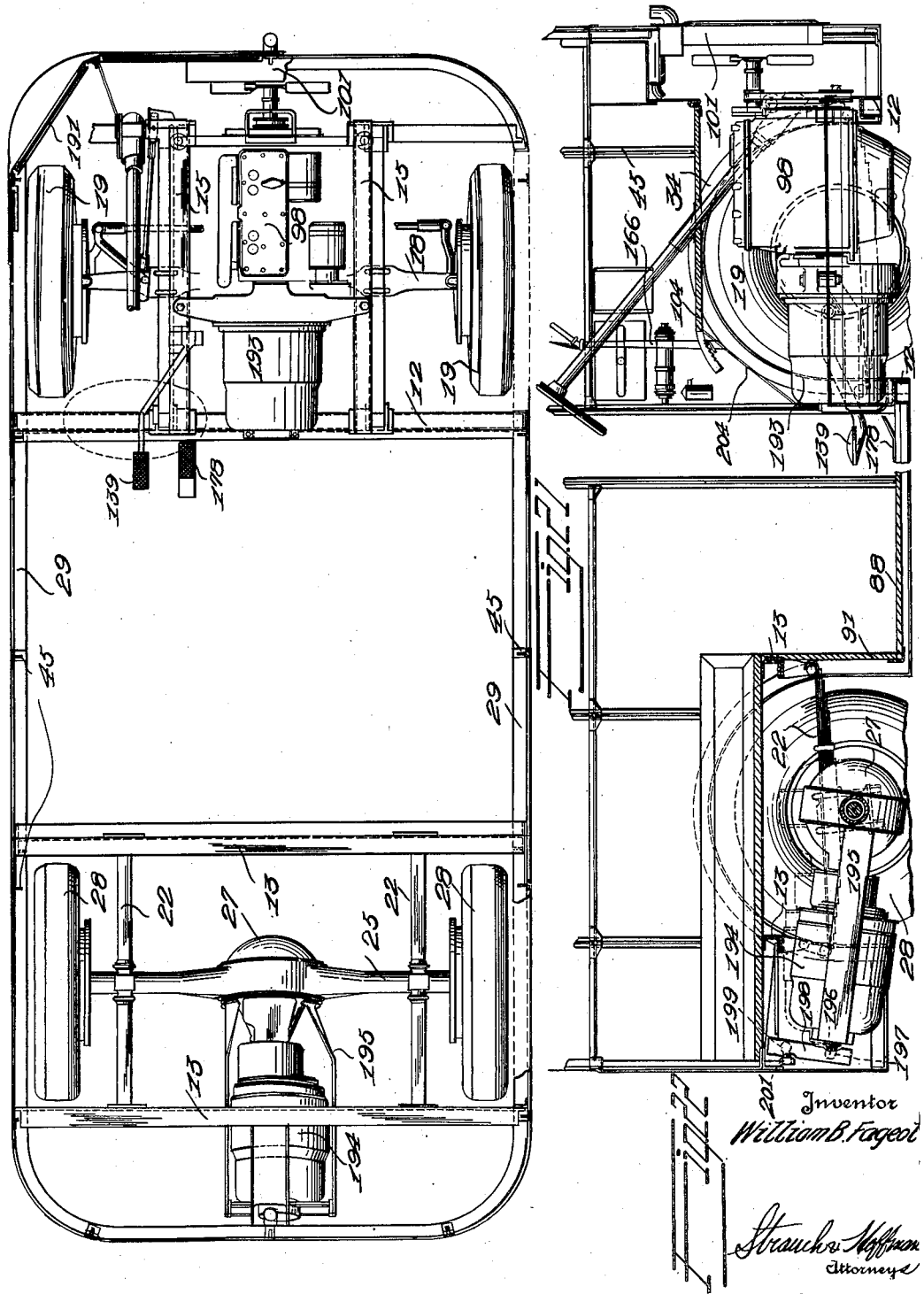

Patented Oct. 22, 1935

2,018,443

UNITED STATES PATENT OFFICE 2,018,443

LOW BED DELIVERY TRUCK

William B. Fageol, Kent, Ohio

Application August 28, 1929, Serial No. 388,994

7 Claims. (Cl. 180—77)

This invention relates to a motor driven delivery truck designed to facilitate the transportation and delivery of merchandise. It is a general practice to utilize trucks for delivery that, aside from the fact that they have a comparatively large carrying capacity located to the rear of the usual position occupied by the driver, are not especially designed to serve the purpose for which they are intended. No special provision is made to enable the operator of the vehicle to readily enter and leave the vehicle as well as to control the vehicle expeditiously in performing his duties. Furthermore, it is not the practice to utilize all available space for a predetermined wheel base and width of chassis.

By this invention it is proposed to provide a road vehicle especially intended for delivery purposes that is designed in all respects, including the control of the power means and its location with respect to the body so as to facilitate the accomplishment of the purposes for which the vehicle is intended. Instead of constructing the body on a chassis, including the customary relatively heavy longitudinally extending chassis frame members, this invention aims to provide a rigid box-like body constructed of relatively light structural material, which body is itself utilized to support the power plant and the various elements that serve to propel the vehicle. That is, instead of mounting a body upon a chassis including a heavy frame construction that is utilized to support the power element, as has been customary heretofore, this invention aims to provide a specially constructed body designed particularly to expeditiously handle merchandise in the course of delivery, which body is so designed as to itself constitute the supporting means for the power plant and the necessary elements that cooperate therewith to drive the vehicle.

This invention also aims to provide a delivery vehicle body that will house not only the power plant, but the wheels of the vehicle, so that the inside dimensions of the delivery body are substantially equal in length and breadth to the overall dimensions of the vehicle at any point. This arrangement provides a wide body that gives a relatively long transversely extending aisle between the wheels of the vehicle in which ample space is provided for several operators while permitting each of them ample room to move around in arranging the merchandise for delivery and to enable large bundles, if the vehicle is used in the delivery of such, to be readily removed from the vehicle.

This invention also aims to provide a vehicle having a floor line that is extremely low so that the operator can readily enter and leave the vehicle body and so that room may be provided to permit the operator or operators of the vehicle to stand without stooping in the space provided in the vehicle. The operator accordingly can work in the vehicle in assorting and arranging the merchandise without assuming tiring stooping positions and in entering and leaving the vehicle he need not assume any uncomfortable position by virtue of the fact that the space in the vehicle is smaller than necessary to permit him to stand up as he enters and leaves the body.

A primary object of the present invention is to provide an inexpensive light-weight delivery truck that is especially designed to factiliate and expedite the delivery of merchandise which in spite of its light weight possesses great strength.

A further object of the invention is to provide a delivery truck especially adapted for the transportation and convenient delivery of merchandise of any kind and which is so designed as to enable the operator of the truck to deliver the merchandise rapidly with a minimum expenditure of physical effort.

A still further object of the invention is to provide a delivery truck having a maximum body space for a given wheel base, and in which the body is so constructed and related to the wheels as to make available the space above the engine and wheels for storage space and to provide ample room within the body to permit the operator to move about and handle the merchandise.

A still further object of the invention is to provide a motor delivery truck embodying novel control mechanism whereby the truck is capable of control with a minimum of effort and attention on the part of the operator, and while the operator is standing in the vehicle body.

A still further object of the invention is to provide a motor delivery truck comprising a body of maximum carrying capacity, said body having a very low floor line and further provided with doors facilitating the delivery of merchandise.

A still further object of the invention is to provide a motor delivery truck especially designed for the expeditious delivery of commodities or merchandise, such as milk in containers, the truck being provided with adjustable illuminating means for readily ascertaining the correct places for delivery at night time.

This application is a continuation in part of my copending application Serial No. 213,389 filed August 16, 1927, now Patent #1,777,966.

Still further objects of the invention will appear as a description thereof proceeds with reference to the accompanying drawings, and wherein:

Figure 1 is a vertical longitudinal sectional view of a motor delivery truck constructed in accordance with a preferred embodiment of my invention.

Figure 2 is a partial horizontal section and a partial top plan view of the body skeleton frame construction.

Figure 3 is a broken front elevational view of the body frame construction.

Figure 4 is a broken front elevational view of the body showing the disposition of the motor and radiator therein.

Figure 5 is a transverse sectional view on line 5—5 of Figure 1.

Figure 6 is a transverse sectional view on line 6—6 in Figure 1.

Figure 7 is a transverse sectional view on line 7—7 in Figure 1.

Figure 8 is a transverse sectional view on line 8—8 in Figure 1.

Figure 9 is a transverse sectional view on line 9—9 in Figure 1.

Figure 10 is a transverse sectional view on line 10—10 in Figure 1.

Figure 11 is a transverse sectional view on line 11—11 in Figure 1.

Figure 12 is a transverse sectional view on line 12—12 in Figure 1.

Figure 13 is a transverse sectional view on line 13—13 in Figure 3.

Figure 14 is a transverse sectional view on line 14—14 in Figures 1 and 3.

Figure 15 is a transverse sectional view on lines 15—15 in Figure 3.

Figure 16 is a transverse sectional view on line 16—16 in Figure 1.

Figure 17 is a horizontal sectional view disclosing the window and sliding door construction, a swinging door being illustrated in Figure 1.

Figure 18 is a fragmentary horizontal sectional view showing swinging doors in end edge view.

Figure 19 is a fragmentary transverse sectional view of the truck body illustrating the brake, clutch and throttle control mechanism in front elevation.

Figure 20 is a fragmentary longitudinal sectional view of the truck body illustrating the brake, clutch and throttle control mechanism in side elevation.

Figure 21 is a horizontal sectional view of a delivery truck provided with a gas-electric power arrangement.

Figure 22 is a broken vertical longitudinal sectional view of the construction illustrated in Figure 21.

Referring to the drawings by reference characters in which like characters designate like parts, 11 designates a body frame construction of relatively light interconnected members as more fully hereinafter described.

The body frame construction 11 comprises a pair of longitudinally spaced transversely extending channel members 12 adjacent the front end thereof and a pair of similarly disposed channel members 13 adjacent the rear end thereof. The channels 12 are provided with longitudinally alined spaced upwardly projecting ears 14 to the forward ones of which the front ends of leaf springs 15 are pivotally secured, as indicated at 16, and to the rear ones of which the rear ends of springs 15 are flexibly connected by shackles 17. The springs 15 are suitably secured intermediate their ends to an axle 18 to the opposite ends of which are rotatably journaled the usual dirigible front wheels 19.

The channel members 13 are provided in any suitable manner with longitudinally alined pairs of downwardly projecting ears 21 to the forward ones of which the front ends of leaf springs 22 are pivotally secured as indicated at 23 and to the rear ones of which the opposite ends of springs 22 are flexibly connected by means of shackles 24. Springs 22 are secured on suitable seats intermediate their ends to a drive axle housing 25 in which drive axles 26 are rotatably mounted, the axles 26 being driven in the usual manner by a conventional differential 27. Each axle 26 has secured to the outer end thereof a drive wheel 28 in any known manner.

The body frame construction 11 comprises in addition to the members 12 and 13 above referred to, opposite side angle bars 29 portions of which as indicated in Figure 1 are disposed substantially below the plane of axes of axles 26, or lower than the hubs of wheels 19. Frame 11 also includes front and rear angle bars 31 and 32. The opposite ends of bars 31 and 32 are arcuately bent, as indicated for defining rounded body corners. The adjacent ends of bars 29, 31 and 32 are in longitudinally spaced relation, as well as in longitudinal alinement, and are interconnected by arcuate angle members 34 curved to surround the wheels partly but being spaced therefrom.

The opposite ends of channel members 12 are connected by means of plates 35 at the juncture of angle members 29, 31 and 34 (Figure 1) and the opposite ends of channel members 13 are connected by plates 36 to the rear arcuate angle members 34. It will be noted that the foremost channel member 12 is disposed above the other member 12 and that the forward springs are rearwardly inclined. It will also be noted that members 13 are disposed substantially above axles 26 for operative connection of springs 22 which may be secured to the upper face of axle housing 25, though underslung springs may be employed if desired.

Suitably secured at the opposite ends thereof to channel members 12 slightly inwardly of ears 14 are a pair of longitudinally extending and transversely spaced angle bars 38 which provide a motor support and which, as indicated in Figure 1, are substantially bowed upwardly permitting unrestricted vertical oscillation of the axle 18. At the rear end of frame 11 a pair of transversely spaced elongated plates 39 are secured to member 32 and a transversely disposed angle member 41 is attached to the inner ends of plates 39 being reversely bent as indicated at 42 to provide an abutment for a spare tire, which as indicated in Figure 1 is admitted or withdrawn through an opening between member 32 and an angle member 43 secured to the rear of the body in any approved manner.

The sides of the body frame construction include vertically disposed T-bars 45, as indicated in Figures 1 and 2, said bars forming the sides of the frame. They are bowed adjacent the outer ends and suitably connected for providing an arched frame for the body roof. The lower ends of the vertically disposed T-bars are secured to members 29, 31 and 32. Similar bars 45 are attached to the ends of the body and such bars are bowed inwardly as indicated at 46 (Figure 2) toward the transverse center of the frame for providing a support for the opposite ends of the roof, the ends of the portions 46 being suitably secured to the arched portions of the adjacent side bars 45.

The bars 45 are interconnected by a horizontally disposed Z-shaped member 47, which extends around frame 11 substantially midway of the height thereof and is interrupted at each side of frame 11 between two adjacent bars 45, as indicated at 48, Figure 1, for providing door openings. A similarly shaped member 49 interconnects bars 45 adjacent the base of the arched roof portion of the frame, the members 47 and 49 together with the intercepted portions of bars 45 defining rectangular window spaces 51 and adjacent bars 45 at each side of frame 11 providing a door opening 52, the outer end of which is defined by a member 53.

It will be observed that the frame described is of substantially the same height from end to end and of substantially the same width, constituting a box-like body, the sides and top of which serve to act as trusses to strengthen the base which is subjected to the weight of the engine, control mechanism, as well as the load. The base does not include the customary heavy chassis frame members, but it is constructed of light structural members as clearly indicated on the drawings. In view of the box-like arrangement of the body frame members and the fact that the frame members are connected together so as to provide a hollow frame of light weight, a relatively inexpensive body is produced of strength sufficient to in itself support the weight of the motor and the load of the vehicle. The lightness of the construction further reduces the cost of operation of the vehicle. The characteristics just alluded to are an important part of this invention. While the box-like nature of the body makes it possible to utilize light structural elements in its construction, said body as hereinafter pointed out, provides a maximum carrying capacity and enables the body to be constructed to provide ample room for the driver to operate the car, to provide an extremely facile exit to and from the body while at the same time providing a vehicle having a very low center of gravity, permitting the driving of the vehicle at relatively high speed around curves in the road, when the vehicle is driven relatively long distances.

Certain of the T-bars 45 are provided with elongated angle plates, providing window sash securing means as well as sliding door stop means in a manner about to be described. As will be seen upon inspection of Figure 1 two spaces 51 are provided at each side of frame 11 rearwardly of door space 52, and bar 45 separating these two spaces is provided with a metallic channel member 55, as indicated in Figure 11, which channel member is provided with oppositely directed flanges 56 which are parallel with the base of channel member 55. Secured as indicated at 57, to the outer face of each of the channel members 55 in a channel member 58 defining a door stop. The bars 45 on opposite sides of door space 52, at each side of frame 11, each having secured to the outer face thereof a Z-bar 59, as indicated in Figures 7 and 9, each of the Z-bars 59 including a flange 61 parallel with flanges 56. Secured to bar 59 at the forward edge of each door space 52 is a channel member 62 providing a second door stop. The bars 45 adjacent the opposite ends of frame 11 or at the junction of the straight sides with the arched corners have one flange thereof cut away, as indicated in Figure 6, and secured to each of the bars 45 is a relatively narrow channel member 63 provided with flanges 64 parallel with flanges 56 and 61.

The two bars 45 at the rear of frame 11 have the bases thereof cut away between members 47 and 49, as indicated in Figure 12, and the base of the stem portion of bar 45 is rounded as indicated at 66 for engagement by the rounded base 67 of a relatively narrow channel member 68 which is suitably secured to each of the bars 45 and is provided with oppositely directed flanges 69 parallel with the end of frame 11. The two bars 45 at the front end of frame 11 are cut away in the same manner as bars 45 at the rear of the frame, as is clearly indicated in Figure 5 and a channel member 71 similar to channel member 68 is engaged about and suitably secured to each of the forward bars 45. Each of the channel members 71 is provided with a flange corresponding to flanges 69 with the flanges 72 of the opposed channel member 71 directed laterally outward of frame 11. Each channel member 71 has the inner leg thereof gradually widened from the inner to the outer end thereof, as indicated at 73, in Figure 1 and each of these legs is provided with a flange 74. The member 47 is substantially Z-shaped, as indicated in Figure 14, and member 49 is also of substantially Z-shape as indicated in Figure 16 but the portion thereof between the forward bars 45 which is indicated in Figure 15, is substantially wider for cooperation with the upper widened ends of legs 71. The bars 45 below member 47 are adapted for the support of the body sheathing in a manner hereafter described.

The opposite sides of channel members 55 and 63 and the corresponding portions of bars 59 with the respective flanges 56, 64 and 61 define seating supports for the corresponding edges of window sash 75, as indicated in Figure 17, the lower and upper edges of which sash are supported in channels defined by members 47 and 49. The sash 75 are preferably secured in position in the manner illustrated in Figure 17, wherein the edges of the glass are all seated in grooves in rubber strips 76, which strips are maintained in seated engagement by means of metallic retaining strips 77, which are suitably secured as by welding, for example, to the respective channel members and bars in firm engagement with strips 76. By the provision of the cut away flanges on the opposite end bars 45 the adjacent edges of the three sash at each end of frame 11 which are secured in position in the manner above described are in relatively closely spaced relation and the opposite edges of the outer ones of the end sash are brought in relatively closely spaced relation to the adjacent edges of the adjacent sash by cutting away one of the flanges of bars 45 as indicated in Figure 6.

By the provision of the outwardly widened adjacent legs of channel member 71 provided with the sloping flanges 74 the central front sash is disposed at a slight angle to the perpendicular as indicated in Figure 1 for the purpose of obviating the glare that tends to obstruct proper vision of the operator.

The body below member 47 is provided with a laminated covering 78, such for example as indicated in Figures 8, 10 and 13 which preferably comprises inner and outer metallic layers 79 and 70 one or more intermediate wood layers 81 all of which layers are riveted together in a manner subjecting the wood layers to compression. The covering 78 is preferably applied in panel form with the edges thereof engaging and secured to bars 45, bars 34 and 29 and member 47. The edges of the panels lapping bars 45 at opposite sides of door spaces 52 terminate flush with the adjacent base edges of bars 45 as indicated in Figures 8 and 10, the edge of the panels engaging the rearmost of these bars being lapped by an external finish plate 82, provided with a flange 83 lapping the edge of the panel and the edges of the panels engaging the foremost of these bars being engaged by the door stop channel 62, as indicated in Figure 8. The adjacent edges of the panels comprising covering 78 lap the corresponding bars 45 in slightly spaced relation, as indicated in Figure 13, and the adjacent edges of the panels are engaged by metallic finish strips 85 the adjacent edges of which are provided with inwardly directed flanges 86 which engage the adjacent edges of the panels as well as the bases of the respective bars 45. The panel edge engaging finish strips are securely riveted through the panels and the bars 45 and a suitable cement may be applied between flanges 86 of strips 85 for preventing any possible admission of water between the layers of the laminated covering 78.

The frame 11 above members 49 and 53 is provided with a covering, preferably, of the same construction as that designated at 78, and is secured to the bowed portions of bars 45 and bars 46 for providing a roof for the truck body.

Disposed in engagement with the rearmost channel member 12 is one face of an angle bar 87, which is suitably secured to member 12 and/or to bars 29 at the opposite ends thereof. Supported on the opposite or horizontal face of bar 87 is one end of a floor 88 the opposite end of which is supported on one leg of an angle bar 89, which is secured at the opposite ends thereof to bars 29 in slightly forwardly spaced relation to the forward ends of the rearward arcuate members 34, as indicated in Figure 1, thus providing a low floor which is disposed substantially below the plane containing the centers of wheels 19 and 28 and which extends substantially from the front wheels 19 to the rear wheels 28. Seated on bar 89 at the rear end of floor 88 is a vertical wall 91, the intermediate portion of which may terminate substantially flush with the outer face of the forward channel 13. Supported on the outer end of the intermediate portion of wall 91 is an angle bar 92. Secured to channel 13 is one end of an elevated floor or platform 93 which extends over the rear channel 13 and is supported at the rear end thereof on a channel member 94 extending transversely of the rear end of frame 11. The opposite sides of wall 91 project upwardly above the topmost points of openings defined by members 34 and secured to these wall extensions are side and top walls 94' and 95 which define a housing for each of the drive wheels 28, the top covers 95 providing suitable merchandise storing space.

Supported on mountings 97 on bars 38 is a gasoline motor 98 with which is associated transmission mechanism 99 in the usual manner, the motor 98 being mounted so as to project below members 38 substantially while permitting vertical oscillation of axle 18, as clearly illustrated in Figure 1. Associated with motor 98 is a radiator 101 the forward face of which is flush with the front end of the body as illustrated in Figures 1 and 4. The motor 98 and the top portions of wheels 19 are enclosed within a housing comprising a vertical wall 102 to the outer end of which is secured an angle bar 103, on which rests one end of a cover 104 the opposite end of which is supported on one leg of an angle bar 105 extending transversely of frame 11, the cover 104 providing an additional support or storage of merchandise. The top portion of radiator 101 is enclosed by a relatively thin angular cover member 106 the lower edge of which is secured to bar 105 and the upper edge of which is secured to member 47.

As will be seen from Figure 1, motor 98 is disposed over axle 18 in such manner that the motor is arranged very low while still permitting sufficient vertical movement between the axle 18 and motor 98 as occasioned by the deflection of spring 15.

The drive wheels 28 are driven by a drive shaft 108, the front end of which has a universal and slip connection 109 with transmission 99 and the rear end of which has a universal and slip connection 111 adjacent the differential 27. The shaft 108 as well as transmission 99 is concealed within a narrow housing or tunnel 113, which extends from wall 91 to wall 102 and is disposed intermediate the opposite sides of floor 88, and projects above the floor of the vehicle.

From the foregoing disclosure it will be seen that a delivery truck body is provided to which the axles are yieldably secured and to which the power and transmission mechanism are secured and that the wheels supported by the axles, power and transmission mechanism are housed within the box-like body in a manner such that floor 88 is disposed closely adjacent the roadway and the space within the body above the wheels and power mechanism is available for the storage of merchandise. In view of the fact that the body is of a width sufficient to house the wheels the space on floor 88 in both sides of tunnel-like housing 113 is substantial, so that ample room is provided on each side of said housing for an operator and one or more delivery assistants, who can leave the vehicle with a minimum expenditure of energy in view of the low floor line and the fact that it is unnecessary for the occupants of the vehicle to stoop when leaving the vehicle. Ample space is provided in front of the vehicle occupants for packages both in front and to the rear. When the vehicle is used to deliver mail or parcels, the letters or packages may be arranged in front of the driver on the shelf over the motor in their order of delivery, where the addresses may be observed while the operator is driving from place to place without substantially interfering with the proper operation of the vehicle.

Furthermore, by disposing floor 88 low as disclosed the door-ways or spaces 52 are of sufficient height to permit the operator to stand in the vehicle body without necessitating a relatively high body.

Each of the door-ways 52 is provided with a door, one or both of which may be a sliding door, as illustrated in Figure 17 or swinging doors as illustrated in Figures 1 and 18.

A sliding door 110, as illustrated in Figure 17, may be employed for one or both door-ways 52. Said sliding door 110 comprises a suitable rectangular frame 112 provided with an edge recess 113 in which is disposed the rubber channel strip or strips 114 which strips engage the edges of a glass panel or panels 115. Each door 110 is suitably mounted for sliding movement parallel with and externally of the body and both vertical edges of each door 110 are provided with yieldable bumpers 116, secured in position by strips 117, the bumpers 116 conforming to the channels in stops 58 and 62, and adapted to engage within same in the open and closed position of the doors respectively.

While the sliding doors 110 may be used, a swinging door 119 as illustrated in Figures 1 and 18 may be employed on one or both sides of the body or particularly on the right side of the vehicle. The swinging door 119 comprises a pair of swinging sections 121 the combined width of which equal the width of doorway 52. The sections 121 are provided with cushion weather strips 122 on the adjacent or free edges thereof and the sections 121 are as in usual practice yieldably maintained in normally closed position with strips 122 in yieldable contact. By the provision of swinging doors as disclosed, the operator is enabled to leave and enter the body by walking through the door 119, the sections 121 of which will open by slight body pressure thereto thus permitting the operator to carry a greater volume of merchandise than would be possible with doors necessitating opening or closing by use of an arm of the operator.

It will be seen from the foregoing disclosure that a truck construction is provided comprising a body of maximum carrying capacity and to which the axles 18 and 25 are directly connected through springs 15 and 22, and in the base of which the motor 98 and transmission mechanism 99 are directly supported thus eliminating the usual relatively heavy chassis construction as above pointed out. The various bars entering into the body frame construction 11 are comparatively few in number and are of relatively light gage, the laminated body covering serving to re-inforce the frame construction thus providing a truck construction which is relatively light and thus well adapted for merchandise transportation and delivery.

By housing the wheels and motor by means of the vehicle body in the manner disclosed convenient supports are provided by the horizontal floor sections or shelves 93, 95 and 104 for merchandise and the greater portion of floor 88 is also available for this purpose as a result of which a large volume of merchandise is capable of transportation within the body disclosed, and the operators have room to move around in the body in an erect position.

In order to provide additional supports for the storage of merchandise a rack 125, as indicated in Figures 1 and 2 may be disposed at the upper portion of the body adjacent each rear corner thereof. If desired similar racks may be disposed only at the front end of the body or such racks may be disposed at both ends of the body. These racks may be of any desired construction but as the truck constituting the present invention is specially adapted to the transportation and delivery of milk the racks 125 are preferably constructed to accommodate empty milk crates, whereby the lower body portion will be substantially unobstructed to facilitate unloading of the milk. The body while of maximum carrying capacity presents an attractive external appearance and is provided with the necessary accessories as visor 126, head lights 127 and front and rear bumpers 128 and 129.

The rear bumper 129 preferably comprises hinged sections for permitting the introduction or removal of a spare tire, and, as is indicated in Figure 1, the bumper 129 is provided with a spring clip 131 adapted to engage the spare tire to support same. By disposing the bumper in contact with an inflated spare tire, the tire serves as a substantial cushion for impacts to the bumper.

By providing the substantially low floor 88 as disclosed not only is a body provided which is of maximum carrying capacity but the entrance to and exit from the body by the operator is greatly facilitated, since he need only step a relatively short vertical distance from the floor 88 to the roadway.

In order to further expedite the delivery of merchandise, such as milk for example, where it is necessary to make a large number of stops at relatively short intervals a novel control mechanism is provided whereby the truck operator is enabled to operate and stop the truck with a minimum expenditure of physical effort thus further greatly relieving the operator and expediting the delivery.

The control mechanism is indicated generally in Figure 1 and illustrated in detail in Figures 19 and 20. Said mechanism embodies means for controlling the gas throttle as well as the clutch and brake operation.

As indicated in Figures 19 and 20, a pedal lever 134 is secured at the forward end thereof to the clutch shaft 135 which shaft is rotatably journaled in the usual or any desired manner. The lever 134 comprises a relatively long straight portion 136 and a relatively short portion 137 preferably offset laterally with respect to portion 136 by a right angularly disposed integral portion 138. A foot engaging member 139 is pivotally connected at 141 to the free end of portion 137 for engagement by a foot of the operator for rocking lever 134 and thus rotating shaft 135 for disengaging the clutch. Pivotally secured at 142 to the portion 136 of lever 134 are the spaced ears 143 of a member 144 between other ears 145 of which, and disposed at right angles to ears 143, is pivotally connected at 146 the intermediate portion of an equalizing lever 147. Pivotally connected at 148 to one end of lever 147 are the ears 149 of a member 151, the opposite end of which is bifurcated and pivotally connected at 152 to one end of a lever 153 whose opposite end is pivotally connected to shaft 135. Suitably supported as by the power mechanism is an adjustable screw 155 which is disposed in the path of movement of lever 153 as indicated in dot and dash lines in Figure 20. The opposite end of lever 147 is pivotally connected at 156 to an adjustable turnbuckle construction 157, the opposite or outer end of which is pivotally connected at 158 to the free end of an actuating lever 159 whose opposite end is fixed to the operating shaft 161 of the hydraulic brake master cylinder 162 provided with outlets 162' for the secondary cylinders. Secured to pivot 156 is one end of a helical spring 163, the opposite end of which is connected to a suitably attached clip 164, the spring normally urging member 157 upwardly for holding the hydraulic brake cylinder in inoperative position.

In operation of the construction disclosed, the lever 134 is depressed by foot pressure on member 139 when it is desired to come to a stop which results in rotation of shaft 135 and consequently the release of the clutch. Upon depressing lever 134 member 144 is depressed which through equalizer lever 147 forces member 151 downwardly which in turn rotates lever 153 about shaft 135 until lever 153 engages screw 155 which arrests movement of lever 153 as well as member 151. Upon depressing lever 134 as above described, lever 147 fulcrums about pivot 156 until lever 153 engages screw 155, which screw is set for complete clutch release and upon further depression of lever 134, lever 147 fulcrums on pivot 148 and forces member 157 downward against the action of spring 163 for actuating lever 159 and operating cylinder 162 for effecting operation of the hydraulic brakes. Thus it will be seen that the clutch and hydraulic brakes are both operable by a single foot pedal which considerably reduces the clutch and brake control effort usually required and permits actuation of the clutch and brake with one foot while the operator is in a standing position.

Secured to the service brake shaft 165 is one end of a hand lever 166, which at the outer free end thereof is provided with a suitable handle and which adjacent the outer end thereof is provided with the usual hand actuated pawl 167 normally engaged with the teeth of a segment 168.

Secured to shaft 165 adjacent lever 166 is one end of a lever 169, the opposite end of which is provided with a roller 171 for rolling contact with lever 134 upon continued rearward movement of lever 166.

Accordingly when hand lever 166 is pulled rearwardly for operating the service brakes, the roller 171 will contact lever 134 whereby upon continued movement of lever 166 the lever 134 will be depressed resulting in releasing the clutch and setting the hydraulic brakes into operation.

It will accordingly be seen that a clutch and brake control mechanism is provided readily accessible to the operator and including a foot controlled lever or pedal for automatically releasing the clutch and effecting operation of the hydraulic brakes and also a hand controlled lever which operates the service brakes and which cooperates with the foot controlled lever for releasing the clutch and setting the hydraulic brakes simultaneous with the setting of the service brakes.

A helical spring 173 has one end thereof secured to the roller carrying end of lever 169 and the opposite end thereof secured to a clip 174 secured in any desired manner, whereby the levers 166 and 169 are yieldably urged into inoperative position.

The control mechanism also comprises a gas throttle control which as indicated in Figures 19 and 20 comprises a throttle operating rod 176 to the end of which is pivotally connected at 177 one end of a foot engaging plate 178, the opposite end of which is pivotally connected as indicated at 179 to a plate 181 suitably secured to floor 88.

Secured to floor 88 immediately to one side of plates 178 and 181 is a block 182 provided with an upper inclined face as indicated at 183.

By means of this construction, the operator can rest one foot on plate 181 and block 182 and by a slight rocking or twisting movement of the foot he can exert various pressures on the hinged plate 178 for operating the throttle for effecting any desired speed.

The member 139 of pedal lever 134 and the plates 178 and 181 and block 182 are arranged relatively to one another so that an operator can stand within the body of the truck with one foot adjacent member 139, and the other foot supported on plate 181 and block 182 thus permitting him to control the movement of the truck with a minimum expenditure of effort and time, which is a valuable asset in connection with delivery trucks where the duties of the operator further include the delivery of merchandise.

Furthermore by the provision of lever 166 it is possible for the operator to anticipate the stops and by manipulating lever 166 the speed of the vehicle can be sufficiently retarded that the operator can leave the vehicle before it entirely stops, thus saving considerable time which is an important factor in delivery operations.

The vehicle, in addition to the brake mechanism above disclosed is preferably provided with an emergency brake construction comprising the brake lever 180 indicated in Figure 1 which is operatively connected to a brake of conventional construction which preferably is, as in common practice associated with the drive shaft.

While the truck construction disclosed is well adapted for the transportation and delivery of merchandise of divers forms it is especially adapted for the delivery of milk.

The bodies of milk delivering trucks as now constructed are subjected to considerable vibration which shakes up the milk thoroughly mixing the cream. It has been found that milk that has been shaken for a substantial period of time sours much quicker than when handled less roughly.

It is accordingly within the scope of the present invention to provide snubbers or cushion means 185 associated with the springs 15 and 22, as indicated in Figure 1 and which are preferably of the construction disclosed in the copending application of R. B. Fageol Serial No. 225,511 filed October 11, 1927 now Patent No. 1,781,631 granted November 11, 1930, whereby shocks and vibrations resulting from irregular road surfaces are substantially absorbed by the spring and cooperating snubbers thus substantially relieving the body from vibration which is highly desirable in milk delivery trucks for the reasons above set forth.

In the delivery of milk most of which is carried out at night time a great deal of time is lost as well as energy expended in locating the proper residences to which delivery is to be made.

In accordance with the present invention, adjustable illuminating means are provided within easy access of the operator, whereby the street numbers on residences can be easily and quickly discerned thus greatly facilitating the delivery operations.

The illuminating means preferably comprises a spot light 186 which as indicated in Figure 1 is mounted in the roof of the truck body at a point above the operator's position within the body. The light 186 may have a universal or similar connection 186' with the roof and is provided within the body with a suitable operating or control handle 187, within easy access of the operator whereby he can readily swing the light in any desired direction for ascertaining the proper residences at which deliveries are to be made.

From the foregoing detailed disclosure it will be seen that a delivery truck is provided which is relatively simple in construction, comparatively light in weight, durable and the body of which is of maximum carrying capacity and that by the provision of the relatively low floor 88, the novel control mechanism and the adjustable illuminating means, an operator is enabled to both operate the truck and deliver merchandise very expeditiously as well as in a convenient and tireless manner, thus adapting the truck construction disclosed admirably to the delivery of milk as well as other commodities and merchandise.

In Figures 21 and 22 is disclosed a modification of the present invention in accordance with which a gas-electric power arrangement is utilized in place of the straight gas arrangement in accordance with the first and preferred embodiment of the invention.

The frame and body construction in this form of the invention is substantially the same as that disclosed in the first form of the invention and as particularly illustrated in Figures 1 and 2. It will be noted however, that the windows at the corners of the body may be plane, as indicated at 191, in Figure 21 instead of being rounded to conform to the rounded body and roof corner portions as in the first form of the invention. The corresponding windows in the first form of the invention may, however, be constructed as indicated at 191. The gasoline motor 98 and radiator 101 are disposed relative to the body in the same relation as in the first form of the invention and the transmission mechanism 99 is, in accordance with the modified arrangement, replaced by a generator 193 having suitable electrical connection with an electric motor 194 operatively associated with the differential 27 for driving the axles 26.

As indicated in Figures 21 and 22 the electric motor 194 is preferably supported within a yoke member 195 which is rigidly secured at one end thereof to the axle housing 25 at either side of differential 27, and at the opposite or rear end thereof yoke member 195 is provided with a ball ended member 196 movably seated in a corresponding socket 197 adjacent the lower end of a substantially vertically disposed suspension bar 198. The bar 198 adjacent the upper end thereof is provided with a socket 199 in which is movably disposed the ball of a ball ended member 201 suitably secured to the rear end of frame 11.

By this construction the bar 198 is connected adjacent the upper end thereof with frame 11 by a ball and socket joint connection whereby bar 198 has a universal swinging connection about and the ball and socket joint connection and as the yoke member 195 has a ball and socket joint connection with the lower end of bar 198, the motor 194 is suspended for free swinging movement about the two universal joint connections with the oscillating movements of the axle housing 25 permitted by the springs 22.

By this arrangement in which the drive axles 26 are driven by the electric motor 194 disposed as disclosed, the drive shaft 108 employed in the first form of the invention is eliminated as well as the housing 113 therefor thus leaving the floor 88 unobstructed which provides greater storage space as well as being more convenient for the operator in that it is not necessary to step over the housing 113.

In accordance with this form of the invention in which housing 113 is not required, the front end wall 102 of the motor housing is replaced by a thin angular cover plate 204 for concealing the rear end of motor 98 and generator 193.

While the internal combustion engine drive arrangement in accordance with the first form of the invention is preferred, it will be seen that by employing a gas-electric drive in accordance with the second form of the invention greater body storage space is provided, and the longitudinally extending propeller shaft can be dispensed with providing a clear passage at a low floor line from side to side of the body.

While I have disclosed but a single specific embodiment of my invention, such specific disclosure is to be considered as illustrative only and not restrictive, since the scope of the invention is defined by the sub-joined claims.

What I claim and desire to secure by U. S. Letters Patent is:—

1. In an automotive delivery vehicle comprising a body, an internal combustion engine, axles carrying wheels supporting said body and engine, a clutch and brake mechanism, a control mechanism for said vehicle comprising a clutch operating lever, a link for operating said brake mechanism, an equalizing link pivoted between its ends to said clutch operating lever and pivotally connected adjacent one end to said link, an arm attached to the other end of said equalizing lever, and an abutment in the path of movement of said arm to limit the movement of the end of the equalizing lever to which it is attached.

2. The combination defined in claim 1 including a hand operated lever provided with means contacting with said clutch operating lever so as to actuate said clutch operating lever upon actuation of said hand lever and thereby release said clutch and thereafter operate said brake mechanism.

3. A delivery vehicle control mechanism comprising a clutch operating arm arranged for operation by the foot of the driver of the vehicle, a link connected between its ends to said arm, mechanism connecting one end of said link to the brake mechanism of the vehicle, and stop means arranged to arrest the movement of the other end of said link after release of said clutch whereby said brake mechanism is actuated after release of said clutch.

4. Control mechanism for the clutch and brake of a motor vehicle, comprising a foot-operated clutch pedal, a rod pivoted to said clutch pedal and reciprocated when said pedal is operated, a brake rod for setting the brake mechanism when reciprocated, an equalizing link pivotally connected to said brake rod and to said clutch pedal rod, means for maintaining said brake rod in unoperated position during a predetermined movement of the clutch pedal, and means for causing simultaneous movement of the brake rod and clutch pedal after said predetermined movement.

5. In an automotive delivery vehicle having a body, an internal combustion engine, wheel supported driving and dead axles, and clutch and brake mechanism; a control mechanism for the vehicle comprising a foot-operated clutch lever, a brake operating rod, means interconnecting said brake rod and clutch lever to cause operation of said brake rod by said clutch lever after predetermined movement of the clutch lever, and a hand operated lever having means for operating said clutch lever to thereby operate said clutch mechanism and said brake rod, said hand lever having an arm provided with anti-friction means engaging the clutch lever on its upper surface.

6. A delivery vehicle comprising a body, front and rear ground wheels supporting each end of said body, a self contained power plant supported by said body at the forward end thereof, a clutch, a low level floor between said front and rear wheels substantially as low as the plane containing the axes of rotation of said wheels and extending from side to side of said body, control means for said clutch, and brake control means for said wheels, and a throttle control device mounted on said floor, said clutch and brake control means being arranged for successive operation by actuation of a foot operated pedal and a hand operated lever adapted to operate said clutch and brake control means, said pedal, said hand lever and said throttle control device being located substantially centrally of said low level floor.

7. In an automotive delivery vehicle comprising a body, an internal combustion engine, axles carrying wheels supporting said body and engine, a clutch, and brake mechanism, a link for operating said brake mechanism, a control mechanism for said vehicle comprising a clutch operating element, means operatively interconnecting said clutch operating element and said brake mechanism comprising a member pivoted adjacent its end to said link, and pivotally connected between its ends to said element, and a stationary adjustable stop to limit movement of the other end of said member.

WILLIAM B. FAGEOL.